US006416702B1

(12) United States Patent
Montague et al.

(10) Patent No.: US 6,416,702 B1
(45) Date of Patent: Jul. 9, 2002

(54) METHOD OF MOLDING A SADDLE ASSEMBLY FOR CIRCUIT BREAKERS

(75) Inventors: Wade A. Montague, Southington; David A. Reid, Forestville; J. Peter McCuin, Bristol, all of CT (US); George T. Parker, Morristown, TN (US); Herman Tremmel, Uncasville; Marshall B. Hart, Middletown, both of CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/565,882

(22) Filed: May 5, 2000

Related U.S. Application Data

(62) Division of application No. 09/108,584, filed on Jul. 1, 1998, now Pat. No. 6,137,070.

(51) Int. Cl.[7] ........................ B29C 39/02; B29C 39/10; B29C 45/14; H01H 9/02

(52) U.S. Cl. ....................... 264/250; 264/259; 361/627; 361/652; 361/653; 361/656

(58) Field of Search ................................ 361/635, 636, 361/634, 644, 652, 653, 654, 655, 656, 658, 673, 600, 601, 627; 264/250, 254, 255, 259, 279, 294

(56) References Cited

U.S. PATENT DOCUMENTS

| | | | | | |
|---|---|---|---|---|---|
| 3,510,729 | A | * | 5/1970 | Gryctko | |
| 4,472,761 | A | * | 9/1984 | Koslosky et al. | 361/355 |
| 4,646,198 | A | * | 2/1987 | Rich et al. | 361/346 |
| 4,646,200 | A | * | 2/1987 | M'Sadoques et al. | 361/355 |
| 4,667,269 | A | * | 5/1987 | Morby et al. | 361/355 |
| 4,713,728 | A | * | 12/1987 | Raabe et al. | 361/363 |
| 4,783,718 | A | * | 11/1988 | Raabe et al. | 361/363 |
| 5,640,294 | A | * | 6/1997 | Caggiano et al. | 361/637 |
| 5,894,404 | A | * | 4/1999 | Vrnak et al. | 361/627 |
| 6,036,542 | A | * | 3/2000 | Montague et al. | 439/595 |
| 6,180,897 | B1 | * | 1/2001 | Montague et al. | 200/50.35 |
| 6,229,692 | B1 | * | 5/2001 | Stendardo et al. | 361/627 |
| 6,252,165 | B1 | * | 6/2001 | Montague et al. | 174/50 |

* cited by examiner

*Primary Examiner*—Angela Ortiz
(74) *Attorney, Agent, or Firm*—Dave S. Christensen; David Arnold

(57) ABSTRACT

A circuit breaker assembly including a first and second circuit breakers each having toggle switch assemblies movable between ON and OFF positions. The toggle switch assemblies have connectors coupled thereto for preventing both circuit breakers from being in the ON position at the same time.

4 Claims, 9 Drawing Sheets

METHOD OF MOLDING A SADDLE ASSEMBLY FOR CIRCUIT BREAKERS

CROSS REFERENCE TO RELATED APPLICATIONS

This is a divisional of pending application Ser. No. 09/108,584, filed Jul. 1, 1998, now U.S. Pat. No. 6,137,070.

BACKGROUND OF THE INVENTION

The present invention is generally directed to circuit breakers, and in particular, to an improved circuit breaker assembly designed to prevent two cooperating circuit breakers from simultaneously being in the ON position. The present invention is also directed to techniques for modifying a multiple circuit breaker load center to accommodate a variety of circuit breaker configurations. Lastly, the invention is directed to an improved box, and in particular, a rainproof enclosure construction and method of making same.

Circuit breaker assemblies comprising, for example, two back fed main breakers (one line from a standard utility and one line from a generator) are well known in the art. At least one known attempt has been made to construct an assembly such that it is impossible for both circuit breakers to be in the ON position at the same time. Such an inhibiting assembly is typically constructed to permit both circuit breakers to be in the OFF position, while also ensuring that one of the two breakers will always be in the OFF position when the other of the two breakers is in the ON position. However, the known circuit breaker assembly is less than desirable for its lack of adaptation to an assembly in which the two circuit breakers are in facing alignment. That is, the known assembly uses an inhibiting assembly which is only applicable wen the circuit breakers are in a side by side arrangement in which the switches thereof move in the SAME direction to be both ON or to be both OFF.

The circuit breaker assembly art is also deficient for its inability to provide a load center assembly that can easily accommodate a plurality of circuit breaker arrangements with only minimal modifications thereto. That is, for example, to modify a state of the art eight-circuit breaker assembly so as to only accept six operational circuit breakers, it is currently necessary to machine cut a portion of the stab terminal assembly so as to avoid an inadvertent coupling of additional breakers. Because of the different needs of different users, it is desirable to incorporate a rejection arrangement during the molding process of a load center assembly to custom design it to accept varying circuit breaker arrangements and eliminate difficult machining processes to accomplish this result. To date a technique for providing this feature is absent in the art.

Also deficient in the circuit breaker art is the ability to construct a rainproof enclosure that overcomes the problem of water leakage. Presently, the known enclosures which are typically of a three piece construction, will allow water to creep in at the edges. This is due to the construction of the enclosure itself.

Accordingly it is desirable to provide circuit breaker assemblies and circuit breaker enclosures that overcome the aforementioned deficiencies. In particular, it is desirable to provide an inhibiting assembly which can easily be incorporated into a circuit breaker assembly where the circuit breakers are in facing alignment and which inhibits the breakers from simultaneously being on. It is also desirable to mold a saddle assembly which satisfies an end user's needs in a more economical and efficient manner. Lastly, it is desirable to provide a rainproof enclosure construction that eliminates water seepage. The invention disclosed herein achieve the aforementioned and below mentioned objectives.

SUMMARY OF THE INVENTION

Generally speaking, in accordance with the present invention, a circuit breaker assembly is provided. In the preferred embodiment, the assembly comprises a first circuit breaker having a toggle switch assembly movable between a first position and a second position, the movement of the toggle switch assembly from the first position to the second position being in a first direction, a second circuit breaker having a toggle switch assembly movable between a first position and a second position, the movement of the toggle switch assembly from the first position to the second position being in the same direction as the first direction and inhibitor connectors for preventing the toggle switch assembly of the first circuit breaker from being in the second position when the toggle switch assembly of the second circuit breaker is in the first position.

In another aspect of the present invention, a process for molding a saddle base is provided. In the preferred embodiment, the process includes the steps of providing a mold for forming a saddle base capable of releasably securing n circuit breakers thereon, determining an undesirable number of circuit breakers for which it is undesirable to mount on the saddle base, wherein the undesirable number is less than n, and integrally molding a selected number of rejection blocks to the saddle base during the molding of the saddle base to prevent the undesirable number of circuit breakers from being secured to the saddle base.

Lastly, in another aspect of the present invention, an improved raintight enclosure is provided. In the preferred embodiment, the enclosure comprises first, second, third and fourth side walls, and a bottom and top side. The first, second and third side walls and the bottom side are integrally formed and the first and second side walls include overlapping sides. The enclosure is formed by defining a unique slot configuration thereby defining the first and second side walls and the two overlapping sides, bending the first and second side walls along predetermined bend lines, bending the first and second overlapping sides along other predetermined bend lines and bending the third side wall along a third predetermined bend line, securing together the side walls and the overlapping sides as well as the fourth side wall and a top to the enclosure and providing that the overlapping sides, which will include respective overlapping areas, overlap any gap formed between the side walls.

Accordingly, it is an object of the present invention to provide an improved inhibiting assembly for a circuit breaker assembly.

Another object of the present invention is to provide an inhibiting assembly for a circuit breaker assembly that ensures the inadvertent simultaneous turning ON of two circuit breakers.

Yet another object of the present invention is to provide an inhibiting assembly for a circuit breaker assembly in which the circuit breakers are in facing alignment.

Still another object of the present invention is to provide an inhibiting assembly that is easily installable in a circuit breaker assembly.

Another object of the present invention is to construct a circuit breaker or load center assembly that will prevent undesirable circuit breakers from being mounted thereon.

Yet another object of the present invention is to more economically and efficiently custom design a circuit breaker assembly for an end user.

Still another object of the present invention is to provide both a six-breaker and an eight breaker assembly with only minor modifications being needed to the saddle base mold to provide the six-breaker version.

Yet another object of the present invention is to provide a rainproof enclosure that eliminates water seepage at the edges thereof.

Still another object of the present invention is to construct the rainproof enclosure from a unitary steel construction without undesirable rework.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

DETAILED DESCRIPTION OF THE PREFERRED EMBODIMENTS

Figure 1:
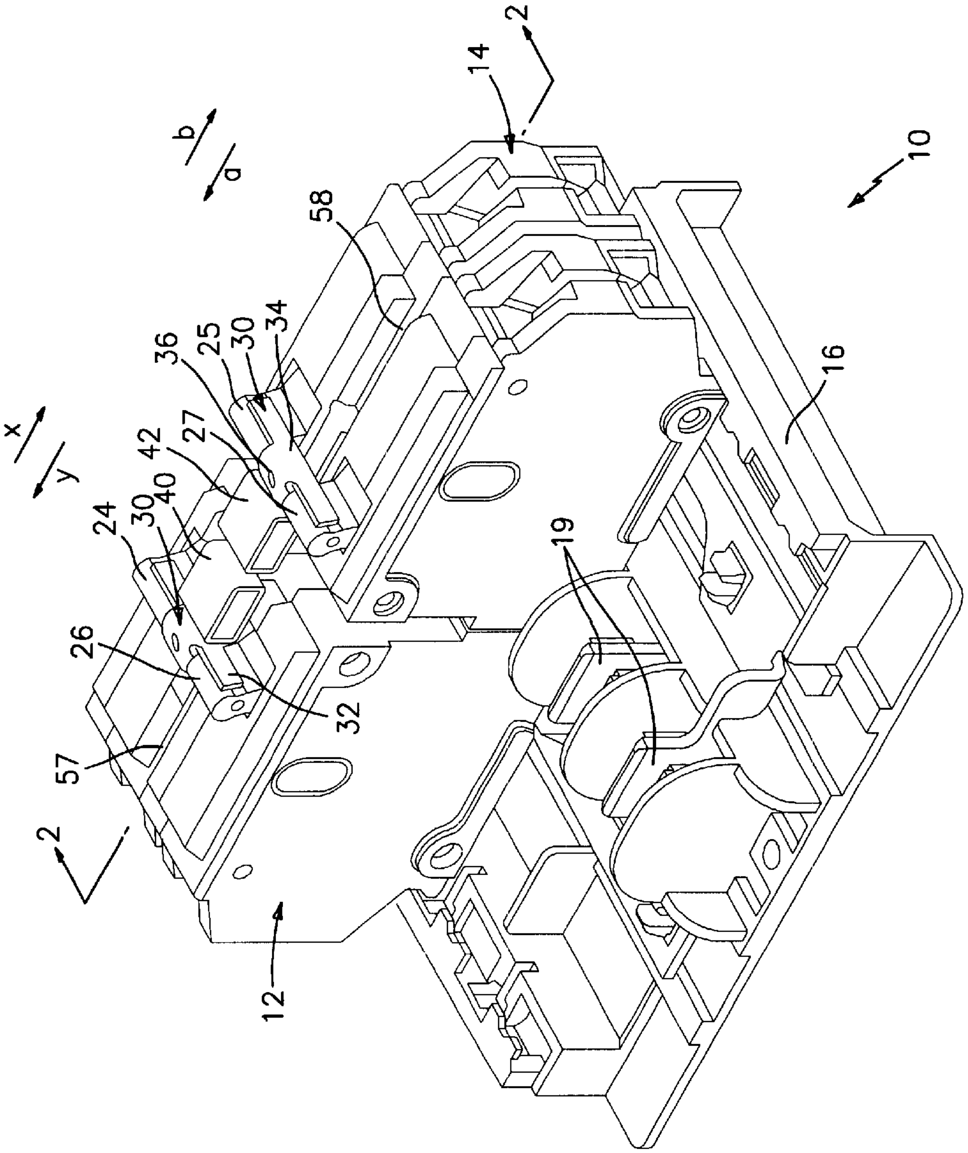
FIG. 1 is a prospective view of a circuit breaker assembly constructed in accordance with the present invention.

Reference is generally made to FIG. 1 which illustrates a circuit breaker assembly, generally indicated at 10, constructed in accordance with the present invention. In particular, depicted is a first two-pole circuit breaker, generally indicated at 12, and a second two-pole circuit breaker, generally indicated at 14. Circuit breakers 12 and 14 are in facing alignment with each other. It should be noted that the exemplary embodiment depicts two two-pole circuit breakers in facing alignment, but it should be well understood that the present invention is equally applicable to two single-pole circuit breakers arranged in facing alignment, or to a multitude of circuit breaker configurations wherein there is at least two breakers in facing alignment.

Circuit breakers 12 and 14 are mounted in facing alignment on a multiple circuit breaker load center 16, the details of which need not be discussed as they would be understood by one of ordinary skill in the art. A plurality of stab terminals 19 are provided to receive first terminal ends of the respective breakers.

Circuit breaker 12, being a two pole breaker, includes a toggle switch assembly which includes a first toggle switch 24 and a second toggle switch 26 for at least essentially simultaneously setting circuit breaker 12 to the ON position or the OFF position. Similarly, two-pole circuit breaker 14 includes a toggle switch assembly which includes a first toggle switch 25 and a second toggle switch 27 for at least essentially simultaneously setting circuit breaker 14 to the ON or OFF position. Reference may hereinafter at times be made to the construction of the present invention as it is applicable with respect to circuit breaker 12, it being similarly applicable to circuit breaker 14.

Each switch assembly may also include a switch coupling bar, generally indicated at 30, which itself comprises a front plate 32, a rear plate 34 and an integrally formed joining member 36. Bar 30 couples each of the respective pairs of toggle switches. In the preferred embodiment, each of the switches 24–27 may also be somewhat hollowly formed (see FIG. 2) so as to receive outwardly extending arms 37 extending from member 36 of bar 30. That is, extending arms 37 (see FIG. 2) of bar 30 may be inserted within the inner region of switches 24–27 to add rigidity to the toggle switch assembly of each circuit breaker and facilitate the at least substantially simultaneous toggling of each pole of the respective two-pole circuit breaker 12, 14.

Figure 3:
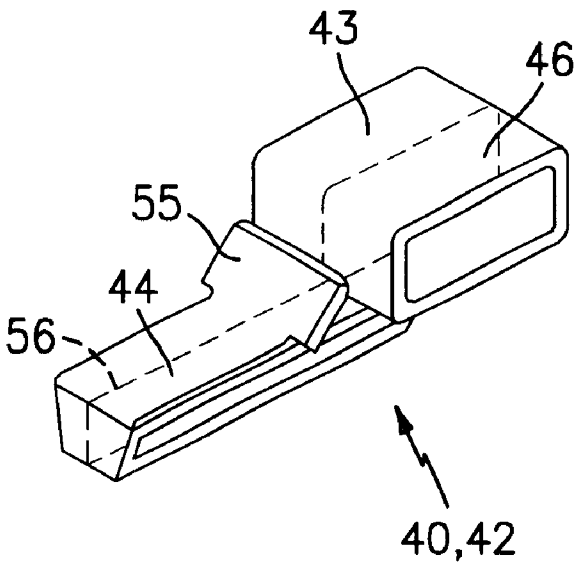
FIG. 3 is a prospective view of an inhibiting connector constructed in accordance with the present invention.
Figure 4:
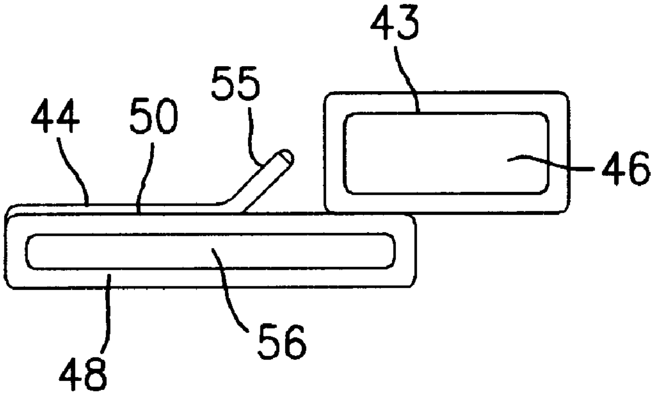
FIG. 4 is a front elevational view of the connector illustrated in FIG. 3.

Assembly 10 also includes a first inhibiting connector 40 and a second inhibiting connector 42, the constructions thereof being identical. Reference will therefore be made to connector 40, the details of which are identical for connector 42. The preferred embodiment of inhibiting connectors 40, 42 is illustrated in FIGS. 3 and 4. Connector 40 is preferably of a unitary plastic construction. Connector 40 includes a head 43 and a tail 44. For added rigidity, head 43 is preferably square or rectangular in shape and may include an inner wall 46 (shown in phantom in FIG. 3). Tail 44 includes at least a bottom surface 48, a top surface 50 and an integrally formed fin 55. Tail 44 may also include an inner wall 56 which adds stability thereto. It will be appreciated from viewing FIG. 3 that tail 44 generally has a trapazoidally shaped cross-section so as to more easily cooperate with a track 57, 58 formed between each of the circuit breakers comprising two-pole breakers 12, 14. However, the cross-sectional shape of tail 44 is a matter of design choice limited only by the shape of track 57, 58.

Figure 2:
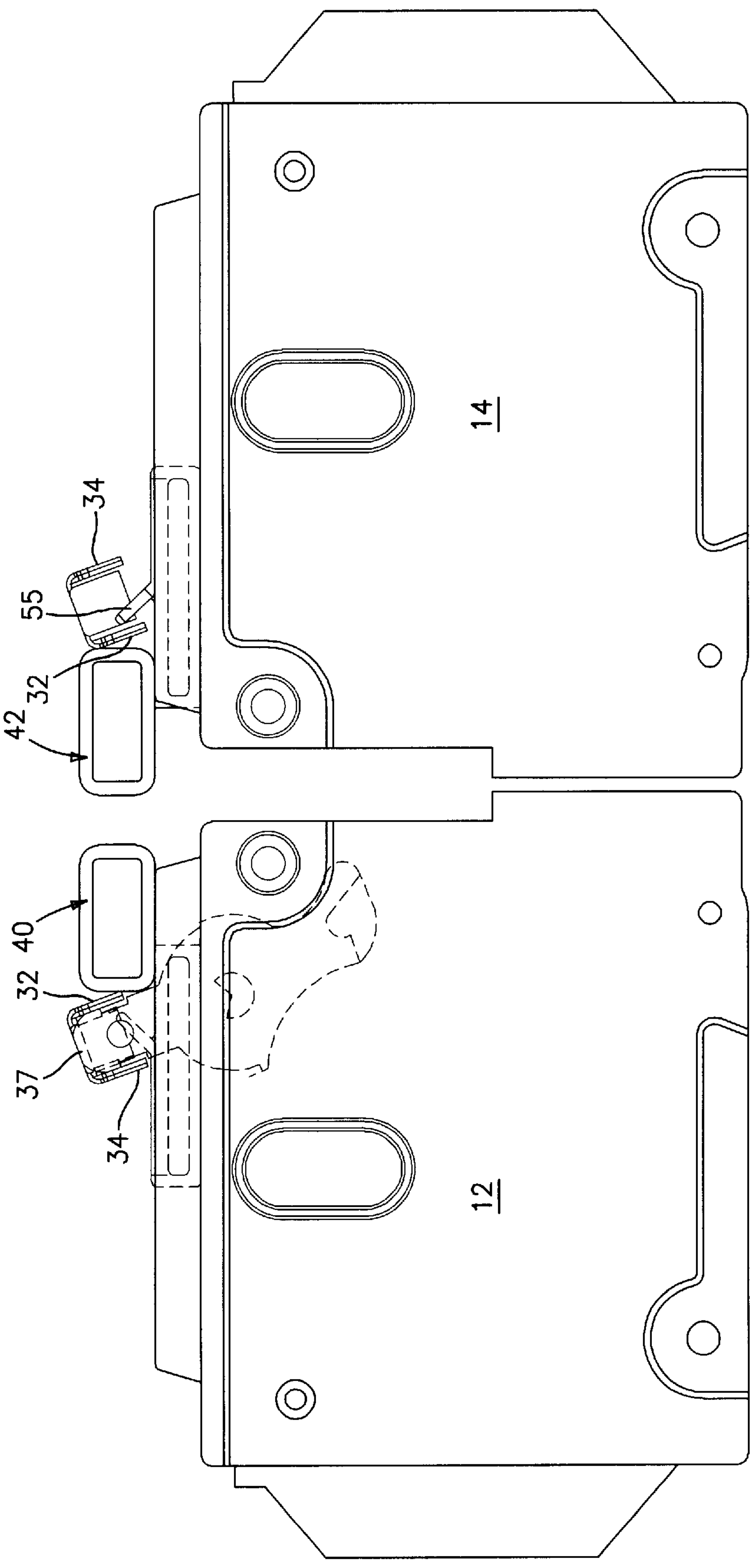
FIG. 2 is a cross sectional view taken along lines 2—2 of FIG. 1 with certain features intentionally left out for purposes of clarity.

Fin 55 is respectively positioned between switches 24, 26 and switches 25, 27 and between front plate 32 and rear plate 34 of bar 30 thereof. As can be seen in FIG. 2, as switches 24 and 26 together toggle between the OFF to ON positions in the direction indicated by the "x" arrow in FIG. 1, plate 32 engages a back surface of head 43. Similarly, as switches 24 and 26 together toggle between the ON to OFF positions in the direction indicated by the "y" arrow in FIG. 1, fin 55 engages the inner surface of front plate 32.

Similarly, circuit breaker 14 is in the OFF position when switches 25 and 27 are moved in the direction of arrow "b" (FIG. 1) and in the ON position when toggled in direction "a" (FIG. 1). Plate 32 will similarly engage the back surface of head 43 when moving in direction a and will engage fin 55 when moving in direction b.

Connector 40 is disposed in position by placing switches 24 and 26 in the OFF position as illustrated in FIG. 2 and sliding tail 44 within track 57 and under bar 30. Pressure placed on fin 55 will cause it to flex and snap under front plate 32. Connector 42 is likewise positioned, it being understood that each connector is positioned before the respective breakers are mounted on saddle base 16.

Figure 5:
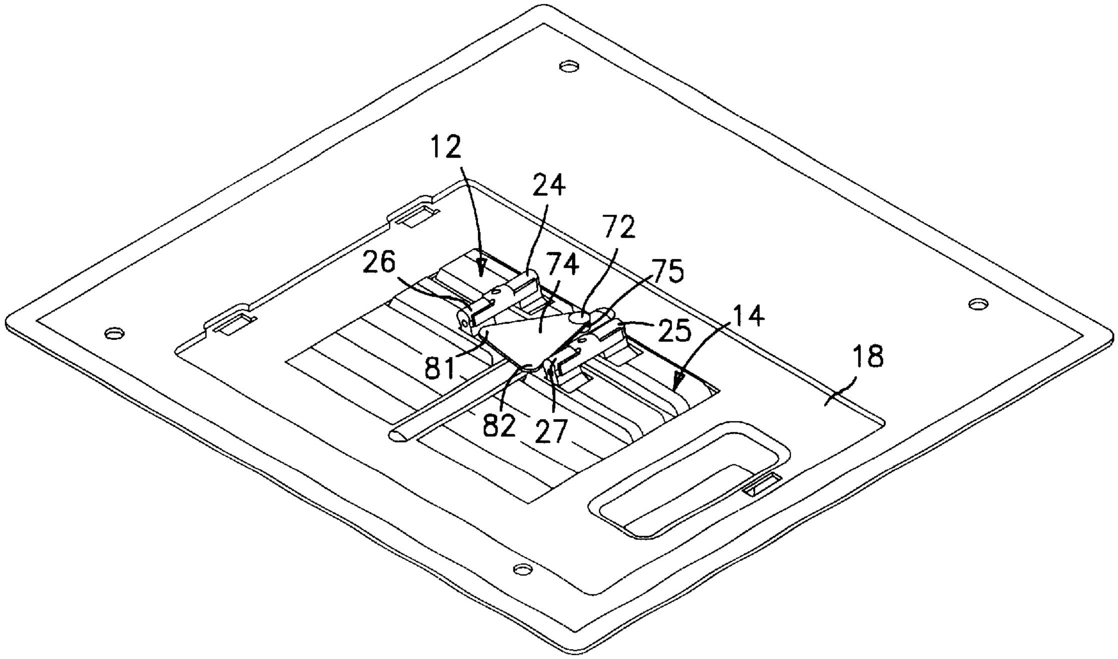
FIG. 5 is a prospective view of an alternate embodiment of a circuit breaker assembly constructed in accordance with the present invention.

With the above construction, it will now be well appreciated that both circuit breakers 12 and 14 are inhibited from being simultaneously placed in the ON position with connectors 40, 42 respectively mounted to the respective toggle switch assemblies. That is, as connector 40 moves in the "x" direction, its contact with connector 42 (assuming connector 42 is in the ON position) causes the switch assembly of assembly 14 to move to the OFF position. Likewise, as connector 42 moves in the a direction, its contact with connector 40 (assuming connection 40 is in the ON position) causes the switch assembly of assembly 12 to move to the OFF position. However, because connectors 40 and 42 are not interconnected themselves, it is possible, in the event it is desirable, for both breakers 12 and 14 to be simultaneously placed in the OFF position. This is achievable by switches 25, 27 being moved in direction "b" and switches 24, 26 being toggled in the direction Reference is now made to FIG. 5 which depicts an alternate embodiment of the present invention. Like parts in FIG. 5 are given like reference numerals to those parts of FIGS. 1–4.

In this alternate embodiment, circuit breakers 12 and 14 are similarly mounted and are at least partially covered by a plate 18. Plate 18 includes an aperture through which a fastener 72 can be inserted. Fastener 72 is secured to plate 18. An inhibitor plate 74 (preferably triangular in shape although this is by way of design choice) is provided in place of connectors 40, 42 to inhibit both circuit breaker 12 and circuit breaker 14 from being positioned in the ON position simultaneously. A spacer 75 can be provided on the undersurface of plate 74 for proper alignment. Plate 74 will rotate about fastener 72. In this alternative embodiment, there is no need for connectors 40, 42 since the rotating nature of plate 74 achieves the desired result. That is, by virtue of the engagement of an edge 81 of plate 74 with the switch assembly of breaker 12 and the engagement of an edge 82 of plate 74 with the switch assembly of breaker 14, both circuit breakers 12 and 14 cannot be inadvertently placed in their respective ON positions simultaneously. However, it will be appreciated that either one of circuit breakers 12 or 14 can be in the ON position as long as the respective other circuit breakers is in the OFF position, while maintaining the possibility that both circuit breakers can be placed in the OFF position simultaneously.

Another advantageous feature of the present invention is the ability to add a cover, similar to plate 18, to the invention as illustrated in FIG. 1. This cover is installable and removable when the toggle switch assemblies of both breakers 12, 14 are in the OFF position.

Figure 6:
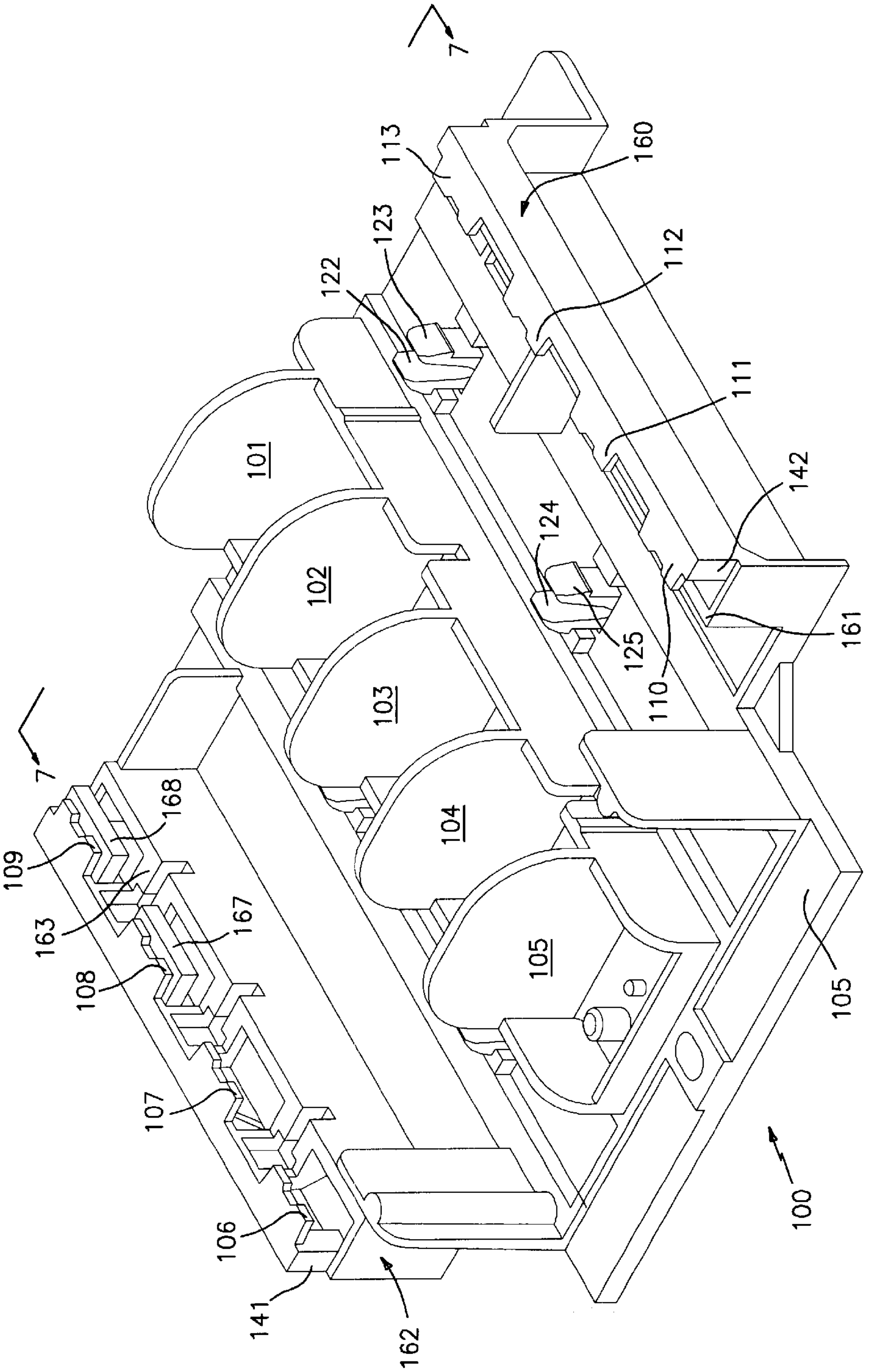
FIG. 6 is a prospective view of a circuit breaker/load center assembly constructed in accordance with the present invention.

Reference is now made to FIG. 6 which depicts an eight circuit breaker (load center) assembly, generally indicated at 100 and similar to the construction to load center 16 depicted in FIG. 1. Load center assembly 100 preferably includes a unitary plastic constructed base 105 comprising a plurality of integrally formed ribs 101–105. Ribs 101–105 provide electrical clearances for the circuit breakers (not shown) mounted therebetween.

Figure 7:
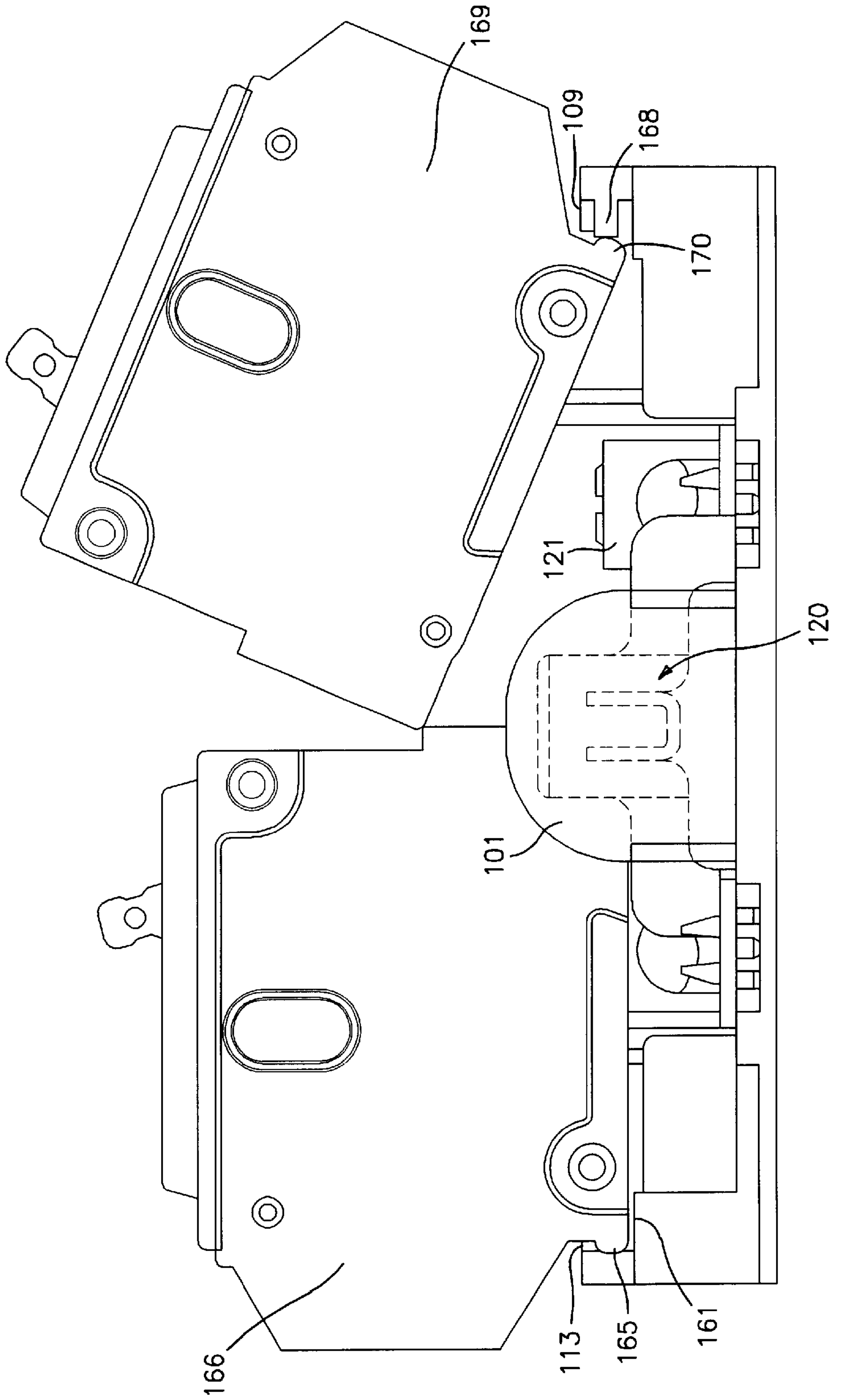
FIG. 7 is a cross-sectional view of the assembly illustrated in FIG. 6 taken along lines 7—7.

As depicted in FIG. 7 (but omitted for simplicity in FIG. 6), base 105 may also include a plurality of integrally formed stab terminals 120 disposed between ribs 101–105. As can now be well appreciated, prior art constructions necessitated that in order to ensure that an eight circuit load center base could only have six breakers mounted thereon, it was necessary to cut-out portions of the stab terminals. This process was costly and complicated.

Base 105 also includes a first extending subassembly 160 and a second extending subassembly 162. Subassembly 160 includes a first top surface 161 and subassembly 162 includes a first top surface 163. Extendingly integrally from subassembly 160 and 162 and above top surfaces 161,163 are respective elongated members 141 and 142. Extending orthoganally from the top edge of elongated member 141 is a plurality of horizontally extending tabs 106–109 and extending orthoganally from the top edge of elongated member 142 is a plurality of horizontally extending tabs 110–113. It can be seen in FIGS. 6–7 that a space is therefore created between the respective top surfaces 161,163 and the orthoganolly extending tabs.

FIG. 7 is a cross sectional view of FIG. 6 but with the addition of certain parts, including two circuit breakers which are illustrated for easy understanding of the present invention. FIG. 7 illustrates two breakers designated by reference numerals 166 and 169. A back hinge 165 of breaker 166 can be positioned in the space provided between tan 113 and top surface 161. In this way, breaker 166 is releasable secured to base 105 by way of the engagement with tab 113 and its line terminal (not shown) connected to its respectively positioned stab terminal.

In the event it is desirable to prohibit a circuit breaker from being electrically connected to assembly 100, either the respectively positioned stab terminal can be removed (as was done in the prior art as discussed above) or the breaker can be prevented from being secured by the respectively positioned rear tab. Closely viewing tabs 108 and 109 clearly illustrate this preferred rejection means. The rejection means is preferably an integrally molded block 167,168 molded to the respective bottom surface of tabs 108 and 109. As illustrated in FIG. 7, a back hinge 170 of circuit breaker 169 is thereby prevented from being inserted into subassembly base 105.

The process for molding a plurality of saddle base configurations for a saddle assembly from one saddle base mold, wherein the saddle assembly includes n stab terminals for coupling to each respective first ends of n circuit breakers (where n in the exemplary arrangement is eight (8)) and the saddle base mold is configurable to mold, integrally with the saddle base, n rear securing means (in the exemplary example the rear securing means being the tabs in combination with the top surfaces of the subassemblies) for respectively securing each respective second end of the n circuit breakers to the saddle base, includes the steps of providing a mold for forming the eight circuit breaker saddle base, determining if it is desirable to ensure that less than eight circuit breakers get mounted thereon, and thereafter, integrally molding a selected number of rejection means such as blocks 167, 168 to either the respective tabs or top surfaces of the subassemblies during the molding of the saddle base to prevent certain circuit breakers from being secured to the saddle base.

The actual molding process should be well understood by one of skill in the relevant art.

In this way, by utilizing the present invention, it is not necessary to remove the stab terminal portions at the locations where it is intended not to have circuit breakers mounted and electrically connected to assembly 100. This advantage lends itself to considerable cost savings during manufacturing since it is much easier to ensure a circuit breaker cannot be inserted to an assembly by providing rejection means as disclose than to remove the necessary stab terminals.

In this way a load center can be modified so as to accommodate a varying number of circuit breaker configurations without the need of complicated, time consuming and expensive machining modifications. That is, by virtue of a simple modification to the saddle base mold, varied consumer needs can be efficiently obtained.

Reference is now made to FIGS. 8–11 which depict the last aspect of the present invention, and in particular, an improved raintight enclosure construction and method of making same. The present invention overcomes the deficiencies provided in the prior art, and in particular, the inability of state of the art box constructions to adequately prevent moisture or other undesirable foreign particles from entering the box at the edges thereof. The present invention achieves this desirable result due to a more smooth interface between the edges of the box.

The present rainproof enclosure construction is particularly well suited for circuit breaker assembly housings but it should well appreciated that such an enclosure construction is equally applicable for any other application, including industrial applications.

Figure 8:
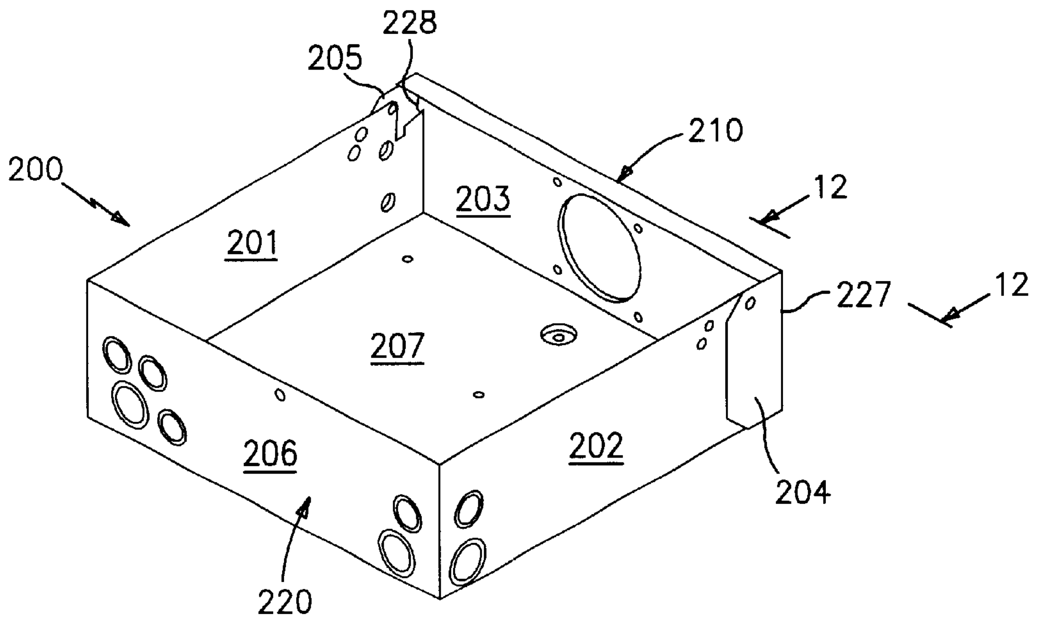
FIG. 8 is a prospective view of a rainproof enclosure constructed in accordance with the present invention.

Generally speaking, reference is first made to FIG. 8 which depicts the front end, generally indicated at 210, of a box, generally indicated at 200, constructed in accordance with the present invention. Front end 210 includes a first corner 227 and a second corner 228. The rear end, generally indicated at 220, is not constructed in accordance with the present invention but can be if it is necessary to achieve the advantages afforded thereby. In particular, box 200 includes side walls 201, 202, 203, and 206. Also depicted is overlapping side walls 204 and 205.

Figure 9:
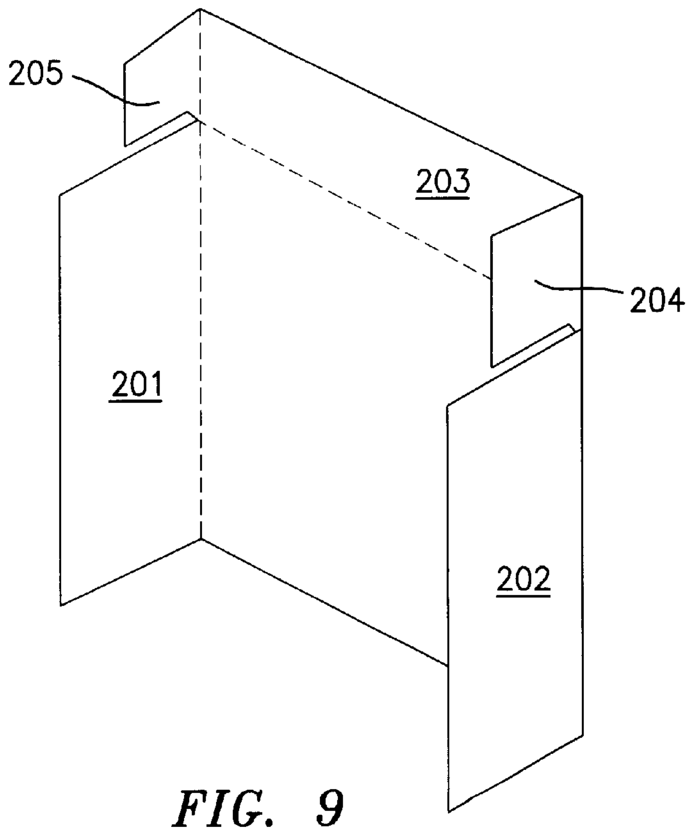
FIGS. 9–11 are views of the rainproof enclosure prior to its completion more particularly illustrating the bend lines and side panels and bottom panel thereof.
Figure 10:
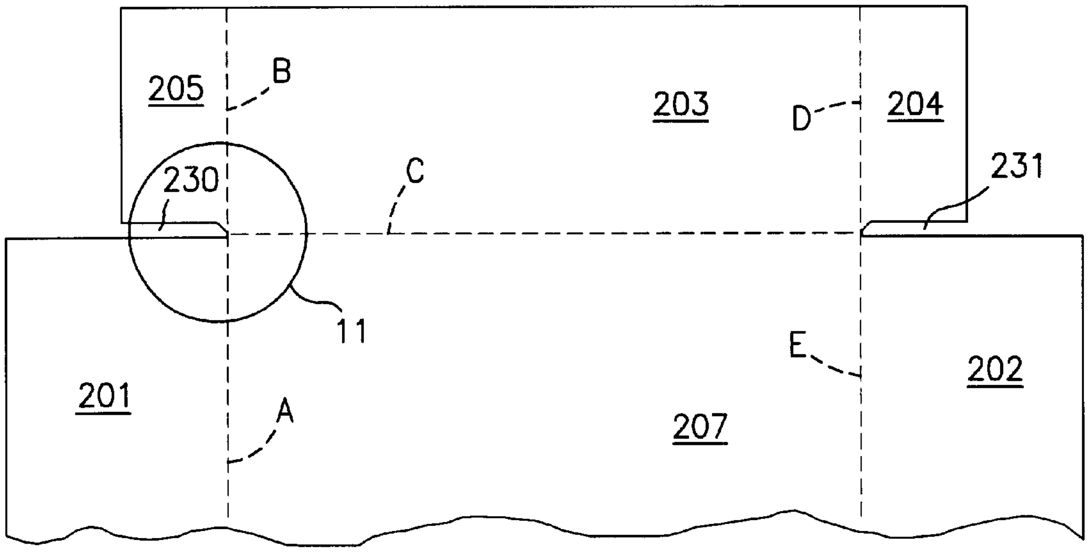

Reference is now made to FIGS. 9 and 10 for a more detailed description of the present invention. As stated above, to construct front end 210 of box 200 in accordance with the present invention, it is necessary to provide a sheet of metal and cut a first slot 230 and a second slot 231 identical in mirror image to slot 230 therein as indicated in FIG. 10. Reference will now be had to the formation of the box edge as it relates to slot 230, the opposing edge being constructed in identical fashion. With the introduction of slot 230, overlapping sidewall 205 is formed, it being integral with side 203. Overlapping sidewall 204 is formed in an identical manner.

Figure 11:
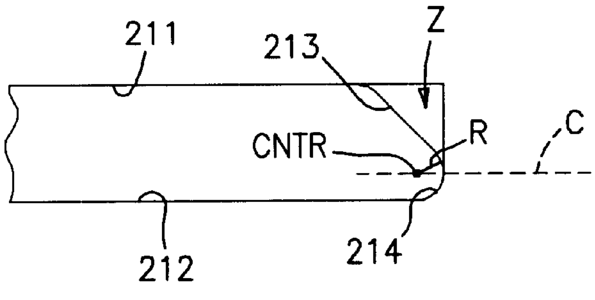

Reference is now made to FIG. 11 for a more detailed description of slot 230, it being understood that slot 231 is defined identically. Slot 230 is defined by a plurality of edges, and specifically, a first edge 211, a second edge 212, an inwardly angled edge 213 which arcuatetly extends and forms an edge 214 joining edge 211. A center CNTR can be established in the arcuate portion of slot 230, the arcuate portion having a radius R. With reference to FIGS. 8–10, sidewalls 201 and 202 are bent upwardly along bend lines A and E respectively which are parallel to each other and tangent to respective arcuate edges 214. Overlapping sidewalls 205 and 204 are inwardly bent at bend lines B and D, respectively, which are also parallel to each other and tangent to respective arcuate edges 214. Sidewall 203 is bent upwardly along bend line C. This bend is forced to occur along an axis about a center line horizontal to bend line C at a point passing through center CNTR. Thereafter, overlapping sidewalls 204 can be secured to sidewall 202 and overlapping sidewall 205 can be secured to sidewall 201 as illustrated in FIG. 8 with welding, swaging or the like. An area Z (FIG. 11) will extend over any gap at edges 227 and 228 formed by the respective overlapping sidewalls.

Figure 12:
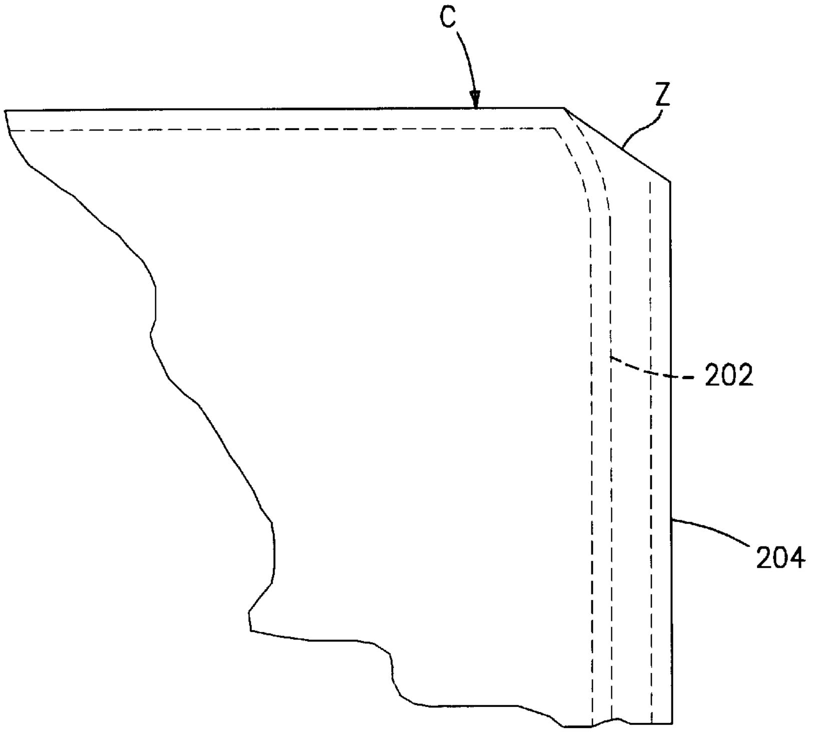
FIG. 12 illustrates an edge of the enclosure taken along lines 12—12 of FIG. 8.

To more properly illustrate the advantageous nature of the present invention, reference is made to FIG. 12. FIG. 12 is a view of FIG. 8 taken along lines 12—12 and for clarity, only depicting edge 227 of box 200.

It can be seen that as sidewall 204 overlaps sidewall 202, any gap that would form along edge E (FIG. 8) is covered by area Z. In this way, moisture and other foreign particles are prohibited from entering the housing.

In the preferred embodiment, edges 211 and 212 are essentially 0.25 inches apart, R is essentially 0.06 inches and the thickness of the preferred material is 16 gauge.

Figure 13:
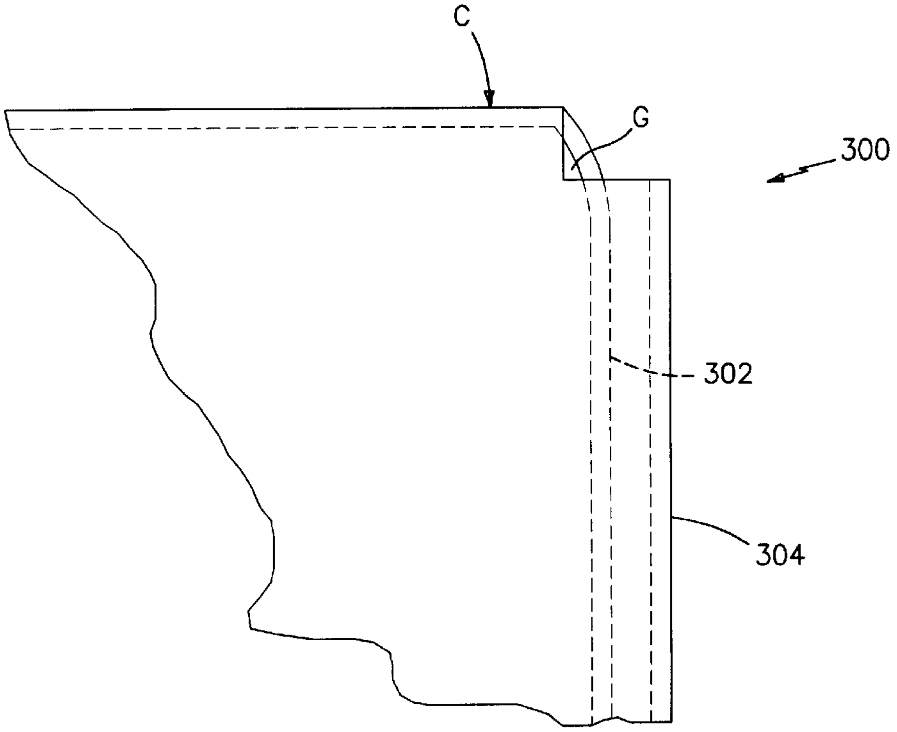
FIG. 13 (PRIOR ART)
FIG. 13 illustrates the corresponding edge of a prior art enclosure.

To contrast the present invention with the prior art, reference is briefly made to FIG. 13 which illustrates the deficiency thereof.

That is, viewing the prior art box 300, it can be seen that as sidewall 304 overlaps sidewall 302 (sidewalls 304 and 302 correspond to sidewalls 204 and 202 respectively) a gap G is formed by virtue of the rectangular slot presently used in constructing the sidewalls. That is, by utilizing slots 230 and 231 as defined herein, an improved box construction is achieved.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein and all statements of the scope of the invention which as a matter of language might fall therebetween.

What is claimed is:

1. A process for molding a plurality of saddle base configurations for a saddle assembly from one n circuit breaker saddle base mold, the saddle assembly comprising n terminal means for coupling to each respective first end of the n circuit breakers and the saddle base mold is configurable to mold, integrally with the saddle base, n rear securing means for respectively securing each respective second end of the n circuit breakers to the saddle base, the process comprising:

providing a mold for forming a saddle base capable of releasably securing n circuit breakers thereon;

determining an undesirable number of circuit breakers for which it is undesirable to mount on the saddle base, wherein the undesirable number is less than n; and integrally molding a selected number of rejection means to a selected number of rear securing means during the molding of the saddle base to prevent the undesirable number of circuit breakers from being secured to the saddle base;

wherein the selected number equals the undesirable number.

2. The process as claimed in claim 1, wherein the rear securing means is a tab and the rejection means is integrally molded to the tab.

3. The process as claimed in claim 1, wherein the rear securing means includes a tab and a top surface of a subassembly molded to the saddle base, and the rejection means is integrally molded to the top surface between the tab and the top surface.

4. The process as claimed in claim 1, wherein n equals eight and the selected number equals two.

* * * * *